United States Patent
Antony et al.

(10) Patent No.: US 12,189,599 B2
(45) Date of Patent: Jan. 7, 2025

(54) LOOKUP TABLE ACTIVATION FUNCTIONS FOR NEURAL NETWORKS

(71) Applicant: Apple Inc., Cupertino, CA (US)

(72) Inventors: Albert Antony, San Jose, CA (US); Francesco Rossi, Sunnyvale, CA (US); Guillaume Tartavel, Cupertino, CA (US); Xiaojin Shi, Cupertino, CA (US); Marco Zuliani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1112 days.

(21) Appl. No.: 17/028,920

(22) Filed: Sep. 22, 2020

(65) Prior Publication Data

US 2021/0397596 A1 Dec. 23, 2021

Related U.S. Application Data

(60) Provisional application No. 63/041,781, filed on Jun. 19, 2020.

(51) Int. Cl.
*G06F 16/22* (2019.01)
*G06N 3/04* (2023.01)

(52) U.S. Cl.
CPC .......... *G06F 16/2282* (2019.01); *G06N 3/04* (2013.01)

(58) Field of Classification Search
None
See application file for complete search history.

(56) References Cited

U.S. PATENT DOCUMENTS

| 10,740,432 B1* | 8/2020 | Diamant | G06N 3/045 |
| 2009/0112334 A1* | 4/2009 | Grichnik | F02D 41/26 |
| | | | 700/48 |
| 2019/0147323 A1* | 5/2019 | Li | G06N 3/047 |
| | | | 706/15 |
| 2019/0385047 A1* | 12/2019 | Lei | G06F 30/27 |

OTHER PUBLICATIONS

Sharma, "Understanding Activation Functions in Neural Networks," Mar. 2017, retrieved from https://medium.com/the-theory-of-everything/understanding-activation-functions-in-neural-networks-9491262884e0, 9 pages.

* cited by examiner

*Primary Examiner* — Wilson Lee
(74) *Attorney, Agent, or Firm* — BAKERHOSTETLER (57) ABSTRACT

The subject technology provides a framework for evaluating activation functions of a neural network using lookup tables. In order to provide lookup table based activation functions with a desired precision within hardware constraints for the lookup tables, multiple lookup tables for each activation function can be provided. Each of the multiple lookup tables may correspond to a respective subrange of input values, within a full range of input values for the activation function.

20 Claims, 7 Drawing Sheets

LOOKUP TABLE ACTIVATION FUNCTIONS FOR NEURAL NETWORKS

CROSS REFERENCE TO RELATED APPLICATIONS

This application claims the benefit of priority to U.S. Provisional Patent Application No. 63/041,781, entitled "Lookup Table Activation Functions For Neural Networks," filed on Jun. 19, 2020, the disclosure of which is hereby incorporated herein in its entirety.

TECHNICAL FIELD

The present description generally relates to developing machine learning applications and, more particularly, to lookup table activation functions for neural networks.

BACKGROUND

Software engineers and scientists have been using computer hardware for machine learning to make improvements across different industry applications. Machine learning applications often include computations of activation functions for each node of a neural network.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models such as neural networks that are trained and then executed to provide predictions in particular applications (e.g., analyzing images and videos, voices, object detection and/or tracking, etc.) among many other types of applications. Executing machine learning models implemented with neural networks can include an evaluation of an activation function at each node, or one or more nodes, of the neural network. The precision required for the result of the activation function can vary for different machine learning applications.

In order to improve the speed and/or efficiency of the computation of the activation functions at the nodes of a neural network, lookup tables can be used to approximate the activation functions (e.g., for activation functions that are either slow to evaluate due to large integrals, inverses computations, etc., or for activation functions which are not supported by a given hardware). For instance, in some hardware implementations, lookup tables can be pre-populated to compute activation functions, such as sigmoid functions and exponential linear unit (ELU) functions.

A lookup table approximates a function, such as an activation function defined on an interval, by a piecewise-linear function that linearly interpolates the values of the function between a set of sample points for which the values of the function are evaluated and stored in the lookup table. The precision with which the lookup table approximates the function depends on the number of sample points (which can be limited by hardware limits on the size of the lookup table), and the selection of the sample points themselves. Some hardware implementations can also limit the selection of the sample points to evenly spaced sample points. For this reason, the precision for a particular machine learning application can be higher than a lookup table approximation can provide for a given hardware implementation.

In accordance with one or more implementations of the subject technology, lookup table based computations of activation functions can be provided with higher precision than is possible with a single lookup table, for a given hardware implementation, by splitting an input range of the activation function into smaller subranges, each of which can be estimated with sufficient accuracy using the available lookup table hardware. Multiple lookup tables, each fitting within the hardware limitations, and each storing activation function values for the input values in one of the subranges, can be used in combination to provide the desired level of precision for a particular machine learning application.

A smooth hand-off and/or continuity is also described between the lookup tables corresponding to each subrange, that provides output continuity while improving precision. Subranges, gaps between the subranges, and lookup table values are described herein that provide an improved precision for a given computational budget. In this way, the present disclosure provides a framework to compute a piecewise-linear approximation within a constrained peak error, even accounting for hardware constraints such as even-spacing of the sample points.

Figure 1:
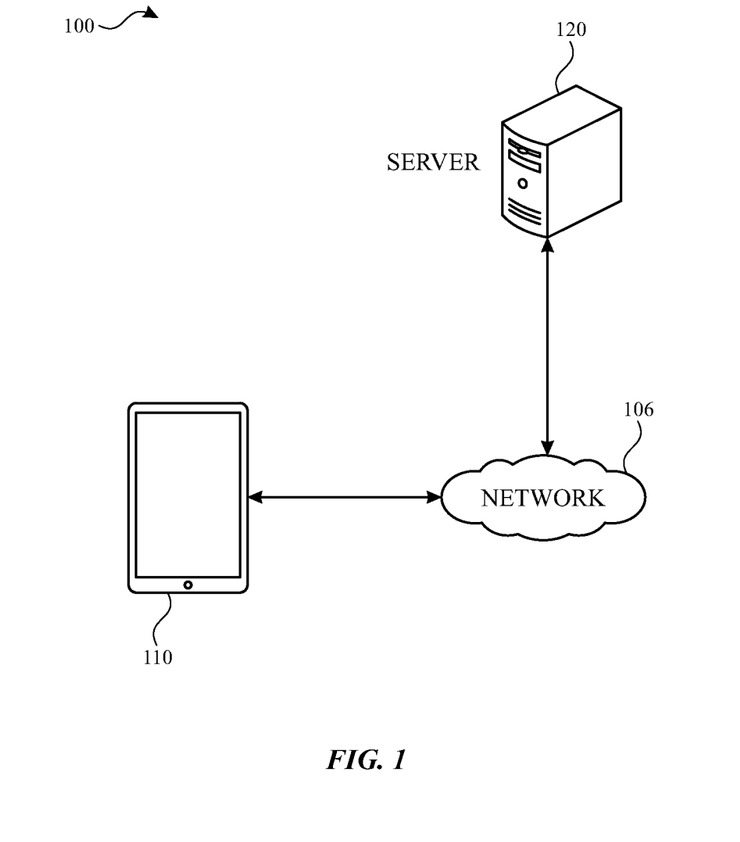
FIG. 1 illustrates an example network environment in accordance with one or more implementations.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a smart watch, a smart band, and the like. In FIG. 1, by way of example, the electronic device 110 is depicted as a mobile electronic device (e.g., a smartphone). The electronic device 110 may be, and/or may include all or part of, the electronic system discussed below with respect to FIG. 2 and/or FIG. 9.

In one or more implementations, the electronic device 110 may provide a system for evaluating a neural network using lookup table (LUT) evaluations of activation functions corresponding to nodes of the neural network, and/or for populating the lookup tables for one or more activation functions. Further, the electronic device 110 may provide one or more machine learning frameworks for training machine learning models implementing the neural networks and/or developing applications using such machine learning models implementing the neural networks. In an example, such machine learning frameworks can provide various machine learning algorithms and models for different problem domains in machine learning. In an example, the electronic device 110 may include a deployed machine learning model that provides an output of data corresponding to a prediction or some other type of machine learning output. In an implementation, the electronic device 110 utilizes the trained machine learning model and continually learns/re-trains the model over time.

Figure 2:
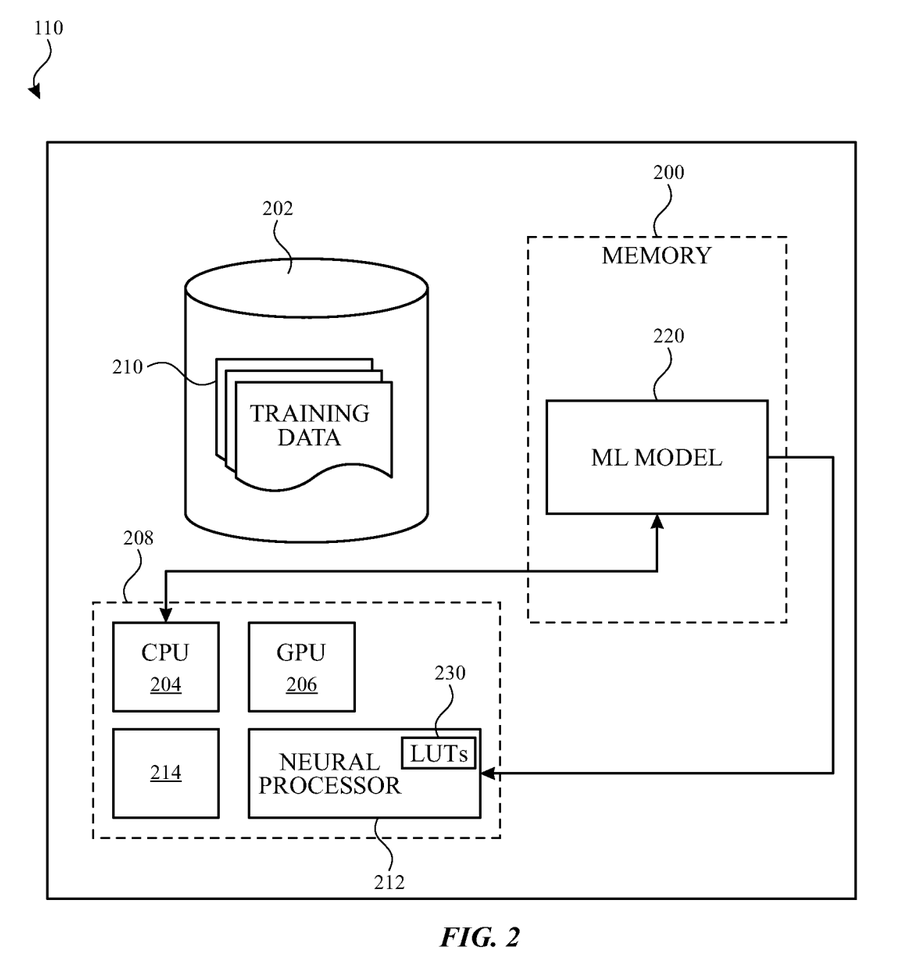
FIG. 2 illustrates an example computing architecture for a system for lookup table based activation functions for neural networks in accordance with one or more implementations.

FIG. 2 illustrates an example computing architecture for a system providing neural networks implemented using LUT based activation functions, in accordance with one or more implementations. For explanatory purposes, the computing architecture is described as being provided by the electronic device 110; however, the computing architecture may be implemented by any other electronic devices, such as desktop computers, laptop computers, wearable devices, tablet computers, or the like. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 110 may include memory 200 storing a machine learning (ML) model 220. The ML model 220 may be a trained machine learning model that includes activation functions for nodes of a neural network and/or parameters (e.g., weights, biases, etc., associated with nodes of a neural network) that have been trained at the electronic device 110 and/or at another device/system and provided to the electronic device 110. In one or more implementations, electronic device 110 may include memory 202 storing training data 210 and/or other input data for training the machine learning model 220.

In the example of FIG. 2, electronic device 110 includes processing circuitry 208. As shown, processing circuitry 208 can include a central processing unit 204 (e.g., a CPU), and a graphics processing unit 206 (e.g., a GPU). In the example of FIG. 2, processing circuitry 208 also includes a neural processor 212 that is optimized for executing machine learning models such as ML model 220 to generate model output data from input data provided to the model.

Executing the ML model 220 (e.g., using the CPU 204, the GPU 206, and/or the neural processor 212) may include evaluating a neural network using lookup tables (LUTs) 230 corresponding to activation functions for the nodes of the neural network. As shown in FIG. 2, processing circuitry 208 may also include local memory 214, such as memory cache that is accessible by one or more of the CPU 204, the GPU 206, and/or the neural processor 212. For example local memory 214 may be formed on a common System on Chip (SoC) with the CPU 204, the GPU 206, and/or the neural processor 212. In various implementations, LUTs 230 may be stored in local memory 214 and/or in hardware registers (e.g., on-chip volatile memory such as on-chip SRAM associated with an individual one of the CPU 204, the GPU 206, and/or the neural processor 212). In the example of FIG. 2, LUTs 230 are depicted as being stored by neural processor 212 (e.g., in on-chip volatile memory for the neural processor, for low latency access to the LUTs 230 when evaluating a neural network).

Local memory 214 and/or on-chip volatile memory for a single one of the CPU 204, the GPU 206, and/or the neural processor 212 can be limited in size in a way that imposes hardware limitations on the available size of the LUTs 230. This can create challenges when the precision with which an activation function needs to be evaluated using the LUTs 230 is higher than what can be provided in single LUT given the hardware limits.

In accordance with aspects of the subject technology, LUTs 230 can include multiple LUTs for each activation function associated with a neural network. In this way, a higher precision LUT based activation function can be provided, within the hardware limits imposed by the device, than can be provided using a single LUT. Challenges can also arise when attempting to use multiple LUTs for a given activation function.

As discussed in further detail hereinafter (e.g., to address the above challenges), the multiple LUTs 230 for a given activation function can each correspond to a subrange of a range of input values that are possible for that activation function, where the subranges themselves, the number of subranges used, and the methods for handling the boundaries of (and/or gaps between) the multiple subranges are arranged to ensure that the approximate activation function values provided by the multiple lookup tables provide the desired precision.

LUTs 230 may include multiple LUTs for a sigmoid activation function, multiple LUTs for a hyperbolic tangent activation function, multiple LUTs for a rectified linear unit activation function (e.g., a ReLU function or a Leaky ReLU activation function), multiple LUTs for an exponential linear unit (ELU) activation function, multiple LUTs for a Softmax activation function, multiple LUTs for a Swish activation function, and/or multiple LUTs for any other suitable activation function for a neural network.

In one or more implementations, the neural processor 212 (and/or CPU 204 and/or GPU 206) may evaluate a neural network associated with ML model 220 by evaluating each of one or more activation functions by obtaining, interpolating, and/or combining the lookup table entries of the multiple LUTs 230 for that activation function. In one or more implementations, an activation function may be a symmetric function of the input values. In implementations in which the activation function that is represented by two or more of the LUTs 230 is a symmetric function, evaluating the neural network may include, for a negative input value to an activation function, obtaining a lookup table value by applying a symmetry function (e.g., $F(-x)=-F(x)$ or $F(-x)=1-F(x)$ for activation functions that are symmetric about an input value "x" of zero) to a lookup table entry (or to an interpolation of the lookup table entries) of a LUT 230 corresponding to a positive subrange of the input values for the activation function.

As described in further detail hereinafter, electronic device 110 and/or another device or system may identify, for each activation function, the number of subranges, the beginning and end points of the subranges, and saturation values for handling input values outside of the various subranges. Electronic device 110 and/or another device or system may then populate the LUT entries of each LUT 230 corresponding to each subrange by evaluating the activation function for one or more input values in that subrange.

In one or more implementations, processing circuitry 208 may be implemented using multiple separate chips corresponding to the CPU 204, the GPU 206, and the neural processor 212. In one or more implementations, processing circuitry 208 may be formed from a single processor complex with different core types or multiple processors of differing types. For example, a processor complex may include a multiprocessing system having multiple clusters of cores, each cluster having one or more cores of a core type, interconnected with one or more buses and/or a memory fabric interconnect.

For example, a memory fabric interconnect may be included in the processing complex to communicatively couple, e.g., interconnect, the different cores and/or processors of the processor complex. In various implementations, a processor complex may include a symmetric multiprocessing system (SMP) having clusters of a same core type where at least one cluster of cores is configured differently from at least one other cluster of cores. Cluster configurations can include, e.g., different configurations of dynamic voltage and frequency scaling (DVFS) states, different cache hierarchies, or differing amounts or speeds of cache. In various implementations, a processor complex may also include an asymmetric multiprocessing system (AMP) having clusters of cores where at least one cluster of cores has a different core type than at least one other cluster of cores. Each cluster can have one or more cores. Core types can include performance cores (e.g., P-cores), efficiency cores (e.g., E-cores), graphics cores (e.g., for GPU 206), digital signal processing cores, arithmetic processing cores, neural processing cores (e.g., for neural processor 212), or generally any type of processing cores. In one or more implementations, the processor complex may be and/or may include a system on a chip (SoC) that may include one or more of the hardware elements in the processing circuitry 208 of FIG. 2.

Figure 3:
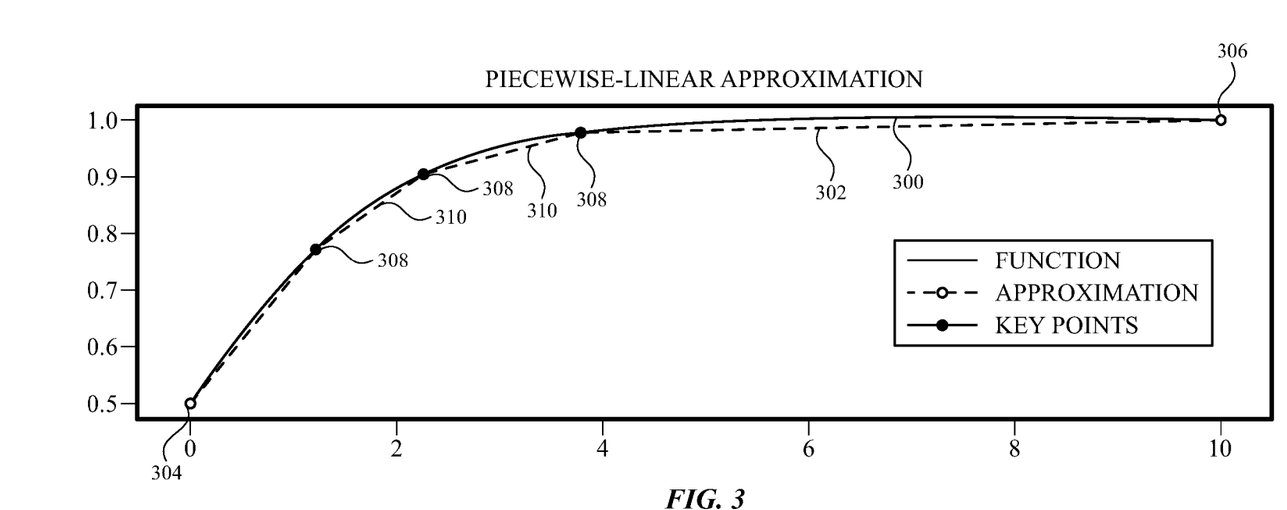
FIG. 3 illustrates a diagram of an activation function and a lookup table based approximation of the activation function in accordance with one or more implementations.

FIG. 3 illustrates an activation function 300 and a LUT approximation 302 of the activation function 300. As shown in FIG. 3, the LUT approximation 302 (e.g., a lookup table based activation function) may be a piecewise linear approximation of the activation function 300. For example, to populate a lookup table 230 corresponding to activation function 300, the values 304, 306, and 308 of the activation function 300 can be evaluated, respectively, at a beginning input value, an end input value, and one or more intermediate input values within a range of possible input values for the activation function. The values 308 provided for the intermediate input values may form the lookup table entries of the LUT. The values 304 and 306 at the respective beginning and end input values may be saturation values that can be used to obtain lookup table values for the lookup table outside of the subrange of the input values corresponding to the lookup table.

During evaluation of the neural network implementing the activation function 300, if an input value to the activation function is one of the intermediate input values used to generate the LUT 230 for that activation function, the lookup table value for the activation function is simply the lookup table entry corresponding to that input value (e.g., and may be the same as the value that would have resulted from an actual evaluation of the activation function 300 using that input value). If an input value to the activation function is between two of the intermediate input values, the lookup table value 310 for that input value may be a linear interpolation between the lookup table entries for the two nearest of the intermediate input values. If an input value to the activation function is between the beginning input value corresponding to value 304 and the lowest of the intermediate input values, the lookup table value 310 for that input value may be a linear interpolation between the value 304 and the value 308 corresponding to the lowest of the lookup input values. If an input value to the activation function is between the highest of the intermediate input values for values 308 corresponding to the lookup table values and the end input value corresponding to value 306, the lookup table value 310 for that input value may be a linear interpolation between the value 308 corresponding to the highest of the lookup input values and the value 306.

These interpolated LUT table values may be different from the values that would have resulted from an actual evaluation of the activation function 300 using that input value, which results in an approximation error when the LUT based activation function (e.g., LUT approximation 302) is used. However, this approximation error can be acceptable if the approximation error is less than the precision error that is acceptable for a given machine learning application.

The beginning input value, the end input value, and/or the intermediate input values can be selected to ensure that the approximation error does not violate the desired precision. Moreover, in some implementations, values 304 and 306 (e.g., saturation values for the lookup table) resulting from the evaluation of the activation function at the beginning and end input values, and/or the lookup table entries resulting from the evaluations of the activation function 300 at the intermediate input values can be modified (e.g., adjusted above or below the evaluated value of the activation function) if the peak of the approximation errors is reduced by this/these modification(s).

In one or more implementations, the range between the beginning input value corresponding to value 304 and the lowest of the intermediate input values corresponding to the values 308 may be referred to as a lower saturation range for that lookup table, and the range between the highest of the intermediate input values corresponding to the values 308 and the end input value corresponding to value 306 may be referred to as an upper saturation range for that lookup table. In one or more implementations, when multiple lookup tables for multiple subranges of the range of an activation function are used, the saturation ranges and the corresponding saturation values can be overlapped and/or adjusted to provide a smooth transition between the multiple lookup tables.

Figure 4:
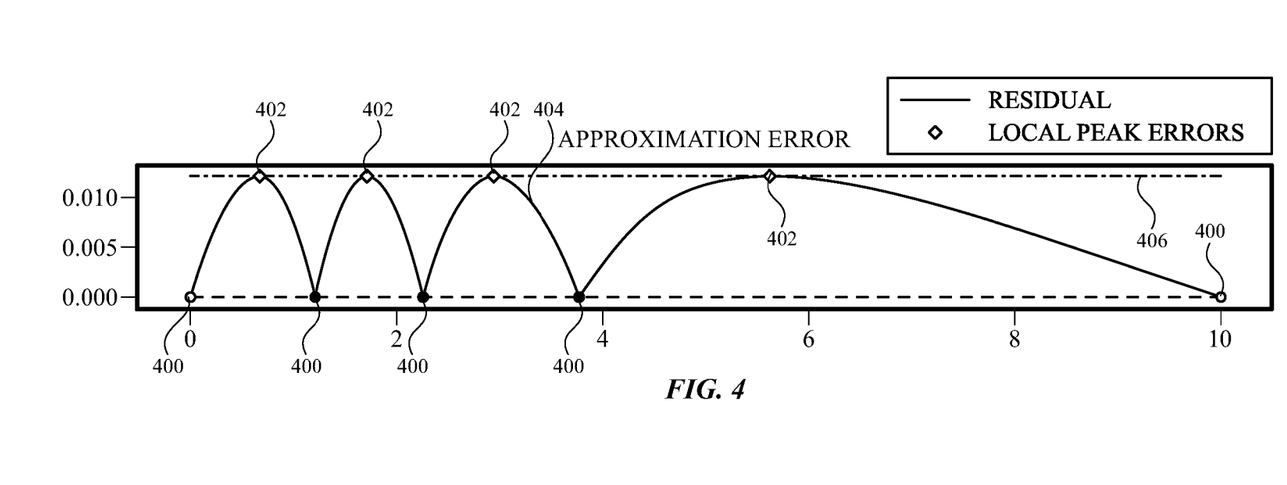
FIG. 4 illustrates a diagram of error values corresponding to a lookup table based computation of an activation function in accordance with one or more implementations.

FIG. 4 illustrates the approximation errors that would result from the LUT based activation function (e.g., lookup table approximation 302), for any input value within the range of input values for activation function 300. In this example, the approximation errors are minimum errors 400 (e.g., zero) where the input value is one of the beginning input value, the end input value, or the intermediate input values used to generate the LUT 230 for that activation function 300. The approximation errors can be seen to rise to local peak approximation errors 402, according to an approximation error curve 404 (e.g., resulting from an absolute value of a subtraction of activation function 300 and LUT approximation 302) when the linear interpolations (e.g., lookup table values 310) are used for input values between the lookup table entries for the two nearest of the beginning input value, the end input value, or the intermediate input values. The largest of the local peak approximation errors 402 may define the peak approximation error 406 for that LUT 230. Adjusting the beginning input value, the end input value, and/or the intermediate input values, and/or adjusting the evaluated values corresponding to those input values, can reduce the peak approximation error for the LUT.

However, given a set of hardware constraints (e.g., a requirement that the intermediate input values be evenly spaced and/or a limitation on the size of the LUT 230), it can be difficult or impossible to reduce the peak approximation error 406, to within the desired precision for a given activation function, when using single LUT. Using multiple LUTs 230 for a single activation function, each LUT corresponding to a subrange of the range of input values for the activation function, can help reduce the peak approximation error 406 for each LUT, and thereby reduce the peak approximation error associated with a set of lookup tables 230 for the activation function.

Figure 5:
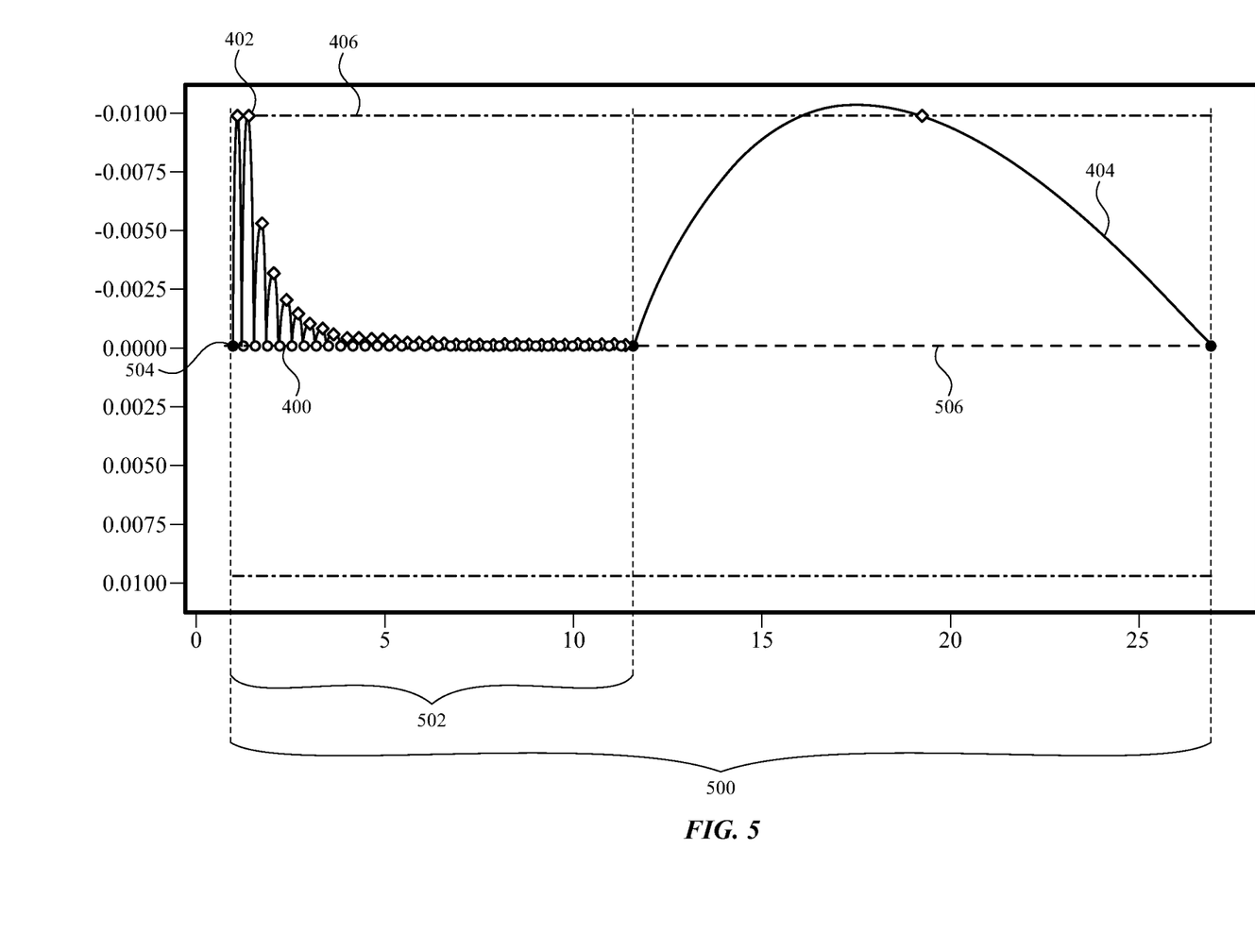
FIG. 5 illustrates a diagram of error values corresponding to a lookup table based computation of an activation function using saturation values in accordance with one or more implementations.

In order to provide smooth transitions between the multiple subranges corresponding to the multiple LUTs 230 for a given activation function, saturation values for each LUT 230 can be defined in overlapping saturation ranges for the lookup tables. As an example, FIG. 5 shows an approximation error curve 404 for a lookup table approximation of an activation function having a range 500 of possible input values, the lookup table approximation defined for a subrange 502 of the range, and saturation ranges 504 and 506 below and above the subrange 502.

In this example, the lookup table approximation function is defined by a value of the activation function at a beginning input value located below the low end of a subrange 502 of range 500, a value of the activation function at an end input value above the high end of subrange 502, multiple values of the activation function at multiple intermediate input values within the subrange 502 (e.g., evenly spaced intermediate values), interpolated values between the beginning, end, and/or intermediate input values, a saturation value for all input values below a saturation range 504 below the low end of subrange 502, and a saturation value for all input values above a saturation range 506 above the high end of subrange 502. In one or more implementations, the saturation value for the saturation range 504 may be a constant value equal to the value of the activation function at the beginning input value. In one or more implementations, the saturation value for the saturation range 506 may be a constant value equal to the value of the activation function at the end input value. In one or more implementations, the saturation values in the saturation ranges 504 and/or 506 may be modified from the value of the activation function at the beginning and/or the end of subrange 502 to reduce the peak error in the saturation ranges 504 and 506 to below the peak approximation error 406 within the subrange 502. In one or more implementations, when multiple LUTs are used for an activation function, one or more of the saturation ranges for the LUTs may overlap, and the saturation values can be set such that a combination (e.g., a sum) of LUT values obtained using the saturation values of the multiple lookup tables provides the LUT table value for the activation function, when an input value is in the overlapping saturation range.

Figure 6:
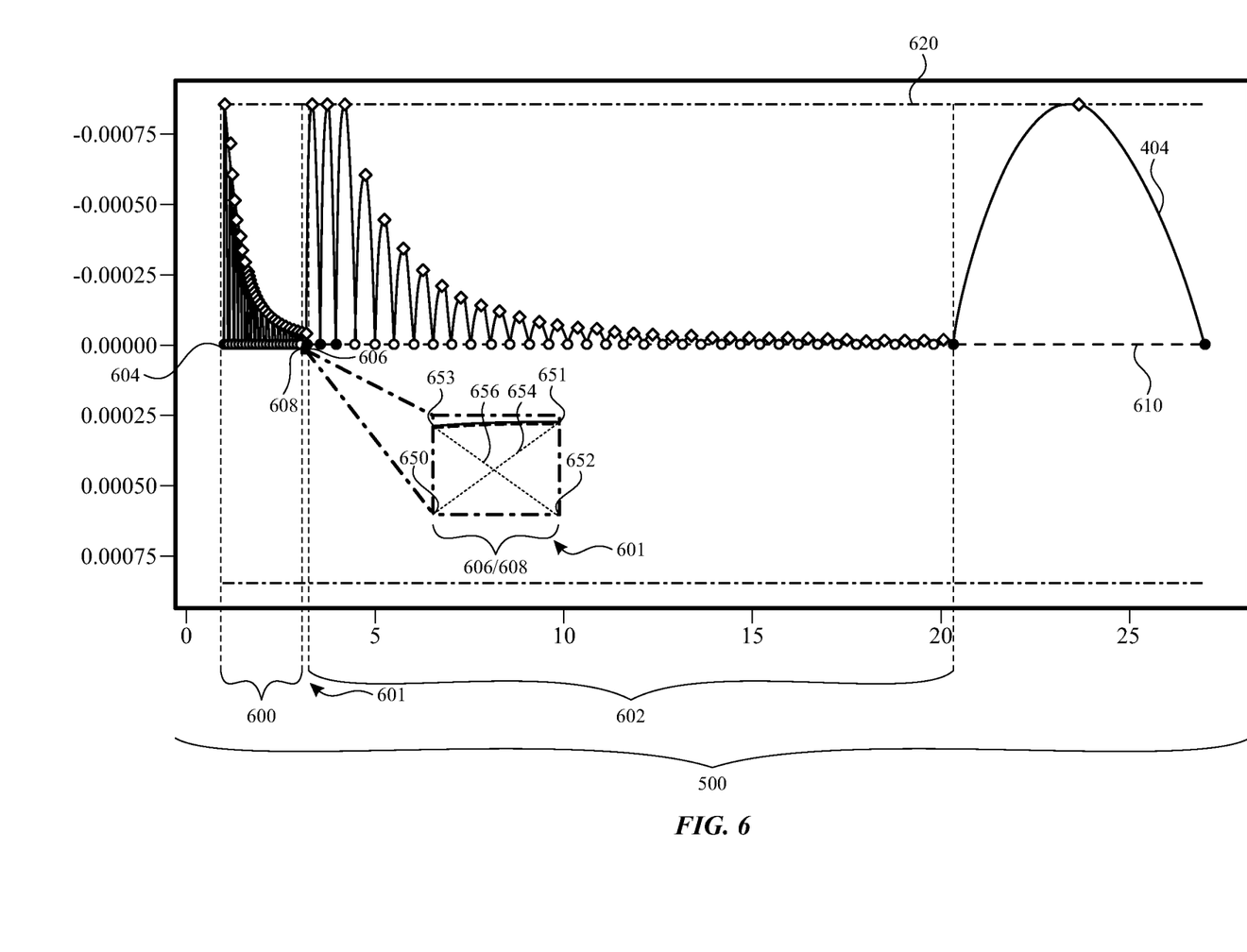
FIG. 6 illustrates a diagram of error values corresponding to a lookup table based computation of an activation function including multiple lookup tables, multiple corresponding input value ranges, and multiple saturation values in accordance with one or more implementations.

FIG. 6 illustrates an approximation error curve 404 for a LUT based activation function defined using multiple LUTs. As illustrated by FIG. 6, a LUT based activation function, for an activation function having an range 500 of input values, can be defined by a first LUT 230 for a first subrange 600 of the range 500 and a second LUT 230 for a second subrange 602 of the range 500. It should be appreciated that the spacing of the lookup table input values for the LUT 230 for subrange 600 is different than the spacing of the lookup table input values for the LUT 230 for the subrange 602. In various implementations, the subranges 600 and 602 may be entirely separate subranges, or can be partially overlapping subranges. As shown in FIG. 6, saturation values for the LUT 230 for subrange 600 can be defined in a saturation range 604 below the low end of subrange 600 and for a saturation range 606 above the high end of the subrange 600, and saturation values for the LUT 230 for subrange 602 can be defined in a saturation range 608 below the low end of subrange 602 and for a saturation range 610 above the high end of the subrange 602.

In this example, the saturation range 606 overlaps with the saturation range 608 to provide a smooth transition in the gap 601 between the lookup tables corresponding to subranges 600 and 602. In one more implementations, the saturation range 608 may also overlap with some or all of the subrange 600, and/or the saturation range 606 may also overlap with some or all of the subrange 602. In one or more implementations, the saturation range 606 for the LUT for subrange 600 may extend from the high end of subrange 600 to the low end of the subrange 602, and the saturation range 608 for the LUT for subrange 602 may extend from the low end of subrange 602 to the high end of subrange 600. As indicated in the inset in FIG. 6 showing an enlarged view of example lookup table values and saturation values in a range of an activation function corresponding to gap 601, in one or more implementations, the saturation value 652 at the high end of the saturation range 606 may be set to zero, and the saturation value 650 at the low end of saturation range 608 may be set to zero. Accordingly, for any input value for which a value (e.g., a LUT based approximation value) of an activation function is desired, there may be two lookup table values (e.g., an interpolated lookup table value from the one of the lookup tables for which the input value is within the subrange, and a saturation value, such as zero, for the other of the lookup tables) that can be obtained and combined to form the value for the activation function at that input value. In scenarios in which the input value for the activation function is in the overlapping saturation range 606/608 covered by both of saturation range 606 and 608, the activation function may be a combination (e.g., sum) of (i) an interpolation 656 of the LUT value 653 at the high end of subrange 600 and the saturation value 652 at the high end of the saturation range 606 and (ii) an interpolation 654 of the LUT value 651 at the low end of subrange 602 and the saturation value 650 at the low end of the saturation range 608.

It should be appreciated that, in this example, the use of two subranges (600 and 602), the widths of the two subranges, the spacing of the lookup table input values (e.g., the intermediate input values) within each of the two subranges, the space (e.g., the gap) between the two subranges, the lookup table entries in each of the two lookup tables corresponding to the two subranges, the beginning and end input values of each of the two lookup tables, and/or the saturation values for either of the two lookup tables corresponding to the two subranges, may have been selected, adjusted, and/or optimized to reduce the peak approximation error 620 for the set of (two) lookup tables (e.g., below an approximation error threshold corresponding to the desired precision for a particular machine learning application). The peak approximation error 620 for a set of lookup tables may be equal to the highest peak approximation error for any of the LUTs in the set. It should also be appreciated that, in other implementations, three or more than three LUTs and corresponding subranges can be used. It should also be appreciated that an error metric other than the peak approximation error can be used to adjust the multiple LUTs and associated ranges.

In one or more implementations, the saturation value at the end of saturation range 606 for the lookup table corresponding to subrange 600 can be adjusted such that, when the input value is within the subrange 602 (e.g., causing the lookup table value corresponding to the LUT 230 for subrange 602 to be combined with the saturation value for saturation range 606 for the lookup table corresponding to subrange 600), the peak error of the combined value is less than or the same as the peak error of the lookup table value from the LUT 230 for subrange 602 alone.

Figure 7:
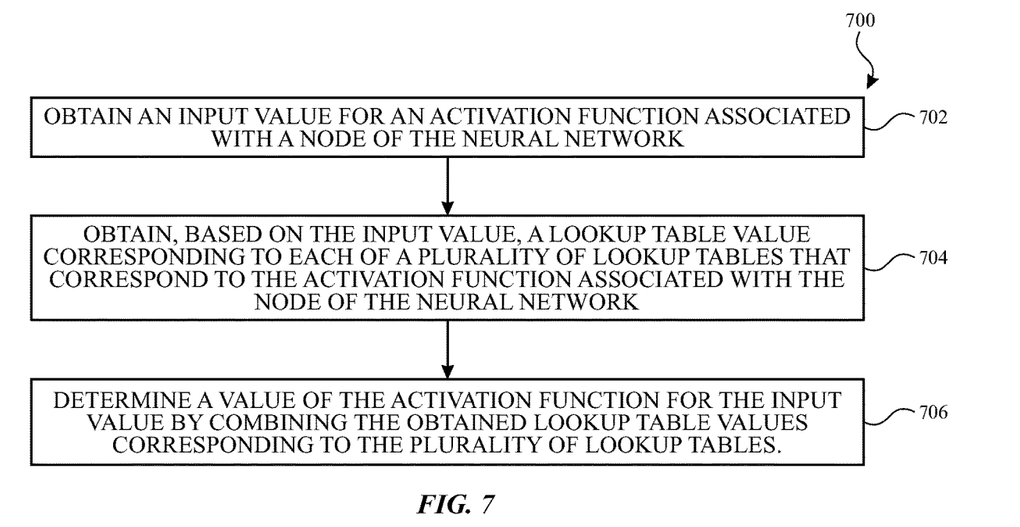
FIG. 7 illustrates a flow diagram of an example process for evaluating a neural network using lookup tables in accordance with one or more implementations.

When it is desired to obtain a value of an activation function for a node of a neural network, an input value within the range 500 may be obtained, lookup table values may be obtained from the two lookup tables corresponding to the two ranges (e.g., an interpolated lookup table value from the one of the lookup tables for which the input value is within the subrange, and a saturation value for the other of the lookup tables, or a combination of interpolated values in an overlapping saturation range), and the lookup table values can be combined as described in further detail in connection with FIG. 7.

FIG. 7 illustrates a flow diagram of an example process for computing an output of a neural network in accordance with one or more implementations. For explanatory purposes, the process 700 is primarily described herein with reference to the electronic device 110 of FIG. 1. However, the process 700 is not limited to the electronic device 110 of FIG. 1, and one or more blocks (or operations) of the process 700 may be performed by one or more components of the server 120 and/or by other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, an electronic device (e.g., a processor such as CPU 204 and/or a neural processor such as neural processor 212 of an electronic device such as electronic device 110) may obtain an input value for an activation function associated with a node of the neural network. The node of the neural network may be a node of a first layer or any other layer of the neural network. The input value may be an input value included in or processed based on input data to a first layer of the neural network, or may be an output value of a node of an earlier layer of the neural network (or processed data based on the output value).

At block 704, the electronic device may obtain, based on the input value, a lookup table value corresponding to one or more (e.g., each) of multiple lookup tables (e.g., LUTs 230) that correspond to the activation function associated with the node of the neural network. In one or more implementations, the activation function has a corresponding range of input values, and each of the multiple lookup tables for that activation function corresponds to a subrange of the range of input values.

Obtaining the lookup table value corresponding to each of the multiple lookup tables based on the input value may include obtaining a lookup table entry from a first one of lookup tables (e.g., if the input value is the same as one of the input values used to populate the lookup table), and/or interpolating between at least two lookup table entries (e.g., if the input value falls between two of the input values used to populate the lookup table) from the first one of the multiple lookup tables to obtain a first one of the lookup table values. The first one of the multiple lookup tables may be a lookup table having respective subrange within which the input value falls.

Obtaining the lookup table value corresponding to each of the multiple lookup tables based on the input value may also include obtaining a saturation value for a second one of the obtained lookup tables as a second one of the lookup table values. For example, the input value may be within the subrange of the input values for the first one of the lookup tables and outside the subrange of the input values for the second one of the lookup tables. In one example, the saturation value may be zero. Obtaining the lookup table value corresponding to each of the multiple lookup tables based on the input value may include obtaining a first interpolated value based on a saturation value for a first one of the obtained lookup tables as a first one of the lookup table values, and a second interpolated value based on a second saturation value for a second one of the obtained lookup tables as a second one of the lookup table values. For example, the input value may be within an overlapping saturation range in a gap between the first one of the lookup tables and the second one of the lookup tables.

In one or more implementations, the activation function may be a symmetric function of the range of input values. Obtaining the lookup table value corresponding to at least one of the lookup tables may include applying a symmetry function (e.g., $F(-x)=-F(x)$ or $F(-x)=1-F(x)$) to a lookup table entry (or an interpolation of lookup table entries) in the at least one of the lookup tables (e.g., for a negative input value of an activation function for which lookup tables for the positive input values of the activation function are stored).

At block 706, the electronic device may determine a value of the activation function for the input value by combining the obtained lookup table values corresponding to the plurality of lookup tables. Combining the obtained lookup table values may include adding the first one of the lookup table values (e.g., the lookup table entry or the interpolation of the lookup table entries corresponding to the first one of the lookup tables) and the second one of the lookup table values (e.g., the saturation value corresponding to the second one of the lookup tables).

The neural network may be evaluated using the determined value of the activation function, to obtain the output of the neural network. For example, evaluating the neural network may include repeating operations of FIG. 7 for multiple nodes in each layer of the neural network.

In order to evaluate a neural network using activation functions that are implemented using lookup tables as described above in connection with FIG. 7, the device implementing the neural network, or another device, may populate and/or store the lookup tables (e.g., in memory accessible by and/or associated with a neural processor of the device). Populating the lookup tables for each activation function may include determining a number of the lookup tables, and the number of subranges for each activation function, and evaluating the activation function at a set of input values within each of the subranges.

Figure 8:
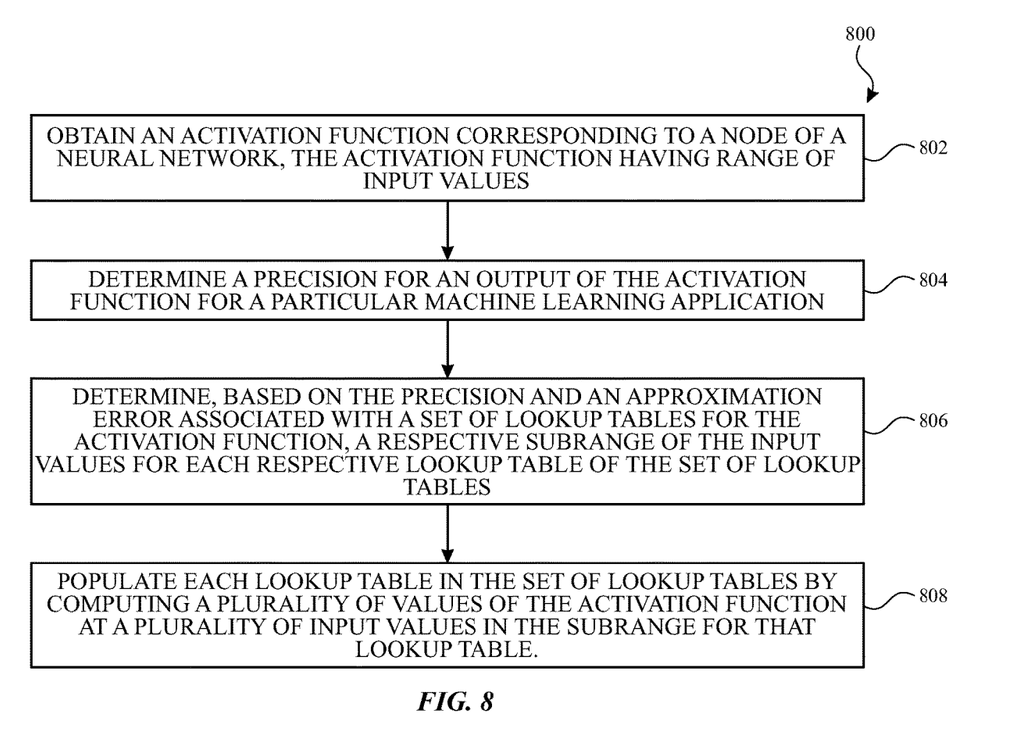
FIG. 8 illustrates a flow diagram of an example process populating lookup tables for activation functions for neural networks in accordance with one or more implementations.

FIG. 8 illustrates a flow diagram of an example process for populating a set of lookup tables for each of one or more activation functions corresponding to notes of a neural network in accordance with one or more implementations. For explanatory purposes, the process 800 is primarily described herein with reference to the electronic device 110 of FIG. 1. However, the process 800 is not limited to the electronic device 110 of FIG. 1, and one or more blocks (or operations) of the process 800 may be performed by one or more components of the server 120 and/or by other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, an electronic device (e.g., a processor such as CPU 204 and/or a neural processor such as neural processor 212 of an electronic device such as electronic device 110) may obtain an activation function corresponding to a node of a neural network, the activation function having range of input values (e.g., a range 500 as shown in FIGS. 5 and 6).

At block 804, the electronic device may determine a precision for an output of the activation function for a particular machine learning application. Determining the precision may include, for example, receiving a user input or developer input indicating the precision.

At block 806, the electronic device may determine, based on the precision and an approximation error (e.g., peak approximation error 620 of FIG. 6) associated with a set of lookup tables for the activation function, a respective subrange of the input values for each respective lookup table of the set of lookup tables (e.g., subranges 600 and 602 as described above in connection with FIG. 6). The electronic device may also determine a number of the subranges (e.g., two in the example of FIG. 6 above, three, or more than three) based on the precision and the approximation error associated with the set of lookup tables for the activation function. The approximation error may be determined by determining a peak difference and/or another difference between interpolated lookup table entries for the input values of the lookup tables of the set of lookup tables, and the actual values of the activation function for those input values. The input values corresponding to each subrange (e.g., including a beginning value, an end value, and/or one or more intermediate values) can also be determined (e.g., and adjusted) based on the precision and the approximation error.

At block 808, the electronic device may populate each lookup table in the set of lookup tables by computing a plurality of values of the activation function at a plurality of input values in the subrange for that lookup table and/or at a beginning input value and an end input value at respective ends of lower and upper saturation ranges below and above the subrange for that lookup table. The plurality of input values in the subrange for each lookup table may be evenly spaced within the subrange for that lookup table, in one or more implementations. In one or more implementations, the input values of a first one of the subranges may be evenly spaced with a first spacing, and the input values of a second one of the subranges may be evenly spaced with a second spacing that is different from the first spacing (e.g., as described above in connection with FIG. 6).

In one or more implementations, populating each lookup table in the set of lookup tables may also include adjusting at least some of computed values of the activation function (e.g., adjusting the lookup table entries and or the saturation values). For example, adjusting the computed values of the activation function may include adjusting one or more of the computed values of the activation function to a value above or below the computed values of the activation function to reduce the approximation error associated with the set of lookup tables for the activation function, prior to storing the computed values as lookup table entries. For example, one or more of the computed values that exactly correspond to the value of the activation function for a corresponding input value can be modified away from the computed value to increase the error at that input value while decreasing the error of one or more interpolated values of the activation function between input values and/or decreasing the error of a combination of lookup table values from multiple lookup tables (e.g., in an overlapping saturation region). Accordingly the beginning value of each of multiple subranges, the end value of each of multiple subranges, the number of the subranges (and accordingly the number of lookup tables), the computed values of the activation function at each of the input values within the subrange, and/or one or more saturation values for each subrange (or LUT) can be adjusted (e.g., collectively and/or jointly) to reduce the total or peak approximation error for the set of tables.

Populating the multiple lookup tables for a given activation function may also include determining first and second saturation values for each lookup table, the first saturation value corresponding to a value of the activation function at an input value below the beginning of the subrange for that lookup table, and the second saturation value corresponding to a value of the activation function at an input value above an end of the subrange for that lookup table (e.g., as described above in connection with FIG. 5). One or more of the saturation values and/or saturation ranges outside of the subranges can also be determined (e.g., and/or adjusted) based on the precision and the approximation error.

The operations of FIG. 8 can be repeated for other activation functions at other nodes of the neural network. The populated set of lookup tables for each activation function (e.g., for each node) can be stored for the activation function, for later use in evaluating a neural network (e.g., using the operations described above in connection with FIG. 7).

The present disclosure recognizes that the use of such personal information data, in the present technology, can be used to the benefit of users. For example, the personal information data can be used in the inputs to or outputs from neural networks.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of inputs to or outputs from neural networks, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
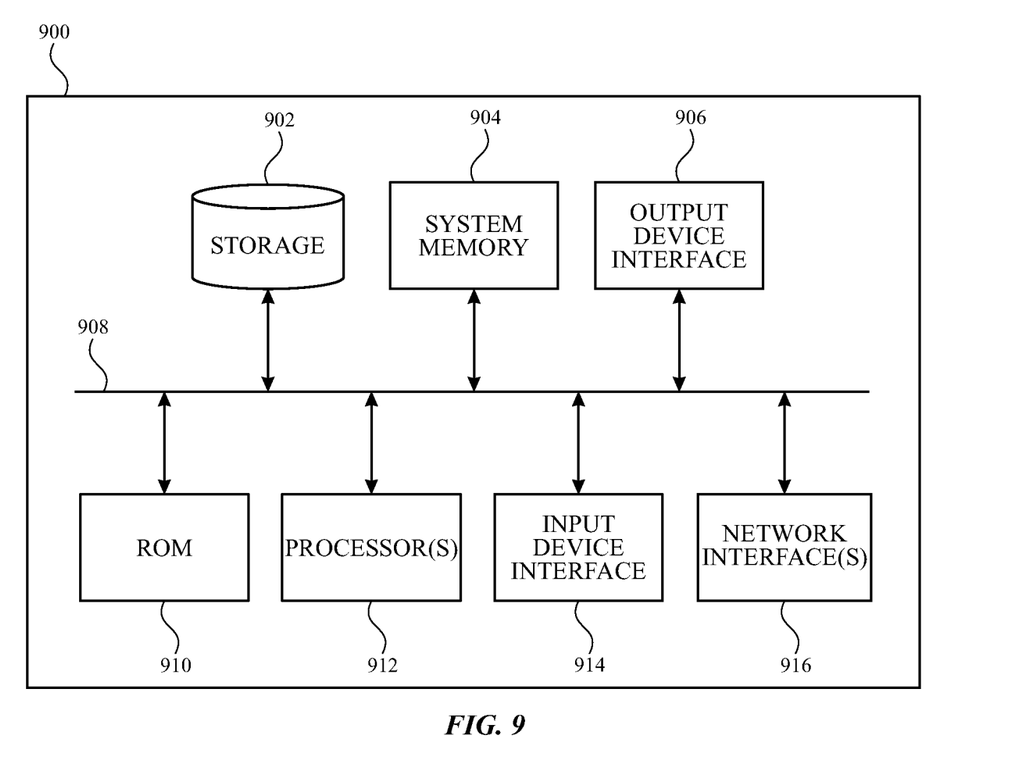
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the electronic device 110, and/or the server 120 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the electronic device 110 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

In accordance with aspects of the disclosure, a method is provided that includes obtaining an input value for an activation function associated with a node of the neural network; obtaining, based on the input value, a lookup table value corresponding to each of a plurality of lookup tables that correspond to the activation function associated with the node of the neural network; and determining a value of the activation function for the input value by combining the obtained lookup table values corresponding to the plurality of lookup tables.

In accordance with aspects of the disclosure, a device is provided that includes a memory storing a plurality of lookup tables corresponding to an activation function associated with a node of a neural network; and a neural processor configured to: obtain an input value for the activation function associated with the node of the neural network; obtain, based on the input value, a lookup table value corresponding to each of a plurality of lookup tables that correspond to the activation function associated with the node of the neural network; and determine a value of the activation function for the input value by combining the obtained lookup table values corresponding to the plurality of lookup tables.

In accordance with aspects of the disclosure, a method is provided that includes obtaining an activation function corresponding to a node of a neural network, the activation function having range of input values; determining a precision for an output of the activation function for a particular machine learning application; determining, based on the precision and an approximation error associated with a set of lookup tables for the activation function, a respective subrange of the input values for each respective lookup table of the set of lookup tables; and populating each lookup table in the set of lookup tables by computing a plurality of values of the activation function at a plurality of input values in the subrange for that lookup table.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of computing an output of a neural network, comprising:
    obtaining an input value for an activation function associated with a node of the neural network;
    obtaining, based on the input value, a lookup table value corresponding to each of a plurality of lookup tables that correspond to the activation function associated with the node of the neural network; and
    determining a value of the activation function for the input value by combining the obtained lookup table values corresponding to the plurality of lookup tables.

2. The method of claim 1, wherein the activation function has a corresponding range of input values, and wherein each of the plurality of lookup tables corresponds to a subrange of the range of input values.

3. The method of claim 1, further comprising evaluating the neural network, using the determined value of the activation function, to obtain the output.

4. The method of claim 1, wherein obtaining the lookup table value corresponding to each of the plurality of lookup tables based on the input value comprises:
    interpolating between at least two lookup table entries from a first one of the plurality of lookup tables to obtain a first one of the lookup table values.

5. The method of claim 4, wherein obtaining the lookup table value corresponding to each of the plurality of lookup tables based on the input value further comprises:

obtaining a saturation value for a second one of the plurality of lookup tables as a second one of the lookup table values.

6. The method of claim 5, wherein combining the obtained lookup table values comprises adding the first one of the lookup table values and the second one of the lookup table values.

7. The method of claim 1, wherein the activation function is a symmetric function of a range of input values, and wherein obtaining the lookup table value corresponding to at least one of the plurality of lookup tables comprises applying a symmetry function to a lookup table entry in the at least one of the plurality of lookup tables.

8. A device, comprising:
a memory storing a plurality of lookup tables corresponding to an activation function associated with a node of a neural network; and
a neural processor configured to:
obtain an input value for the activation function associated with the node of the neural network;
obtain, based on the input value, a lookup table value corresponding to each of a plurality of lookup tables that correspond to the activation function associated with the node of the neural network; and
determine a value of the activation function for the input value by combining the obtained lookup table values corresponding to the plurality of lookup tables.

9. The device of claim 8, wherein the neural processor is configured to obtain the lookup table value corresponding to each of the plurality of lookup tables based on the input value by:
interpolating between at least two lookup table entries from a first one of the plurality of lookup tables to obtain a first one of the lookup table values; and
obtaining a saturation value for a second one of the plurality of lookup tables as a second one of the lookup table values.

10. The device of claim 9, wherein the neural processor is configured to combine the obtained lookup table values by adding the first one of the lookup table values and the second one of the lookup table values.

11. The device of claim 8, wherein the activation function has a corresponding range of input values, and wherein each of the plurality of lookup tables corresponds to a subrange of the range of input values.

12. The device of claim 8, wherein the neural processor is further configured to evaluate the neural network, using the determined value of the activation function, to obtain the output.

13. A non-transitory computer-readable medium comprising instructions, which when executed by a computing device, cause the computing device to perform operations comprising:

obtaining, by a neural processor, an input value for an activation function associated with a node of the neural network;
obtaining, by the neural processor based on the input value, a lookup table value corresponding to each of a plurality of lookup tables that correspond to the activation function associated with the node of the neural network; and
determining, by the neural processor, a value of the activation function for the input value by combining the obtained lookup table values corresponding to the plurality of lookup tables.

14. The non-transitory computer-readable medium of claim 13, wherein the activation function has a corresponding range of input values, and wherein each of the plurality of lookup tables corresponds to a subrange of the range of input values.

15. The non-transitory computer-readable medium of claim 14, wherein the subrange of the range of input values for each of the plurality of lookups table are evenly spaced within the subrange for that lookup table.

16. The non-transitory computer-readable medium of claim 13, wherein the operations further comprise: evaluating the neural network, using the determined value of the activation function, to obtain the output.

17. The non-transitory computer-readable medium of claim 13, wherein obtaining the lookup table value corresponding to each of the plurality of lookup tables based on the input value comprises:
interpolating between at least two lookup table entries from a first one of the plurality of lookup tables to obtain a first one of the lookup table values.

18. The non-transitory computer-readable medium of claim 17, wherein obtaining the lookup table value corresponding to each of the plurality of lookup tables based on the input value further comprises:
obtaining a saturation value for a second one of the plurality of lookup tables as a second one of the lookup table values.

19. The non-transitory computer-readable medium of claim 18, wherein combining the obtained lookup table values comprises adding the first one of the lookup table values and the second one of the lookup table values.

20. The non-transitory computer-readable medium of claim 13, wherein the activation function is a symmetric function of a range of input values, and wherein obtaining the lookup table value corresponding to at least one of the plurality of lookup tables comprises applying a symmetry function to a lookup table entry in the at least one of the plurality of lookup tables.

* * * * *